US008424898B2

United States Patent
Rimmelspacher et al.

(10) Patent No.: US 8,424,898 B2
(45) Date of Patent: Apr. 23, 2013

(54) TRAILER HITCH

(75) Inventors: Bernhard Rimmelspacher, Rheinstetten (DE); Joerg Riehle, Asperg (DE); Hartmut Haustein, Wiernsheim (DE)

(73) Assignee: Scambia Industrial Developments Aktiengesellschaft, Schaan (LI)

( * ) Notice: Subject to any disclaimer, the term of this patent is extended or adjusted under 35 U.S.C. 154(b) by 760 days.

(21) Appl. No.: 12/456,848

(22) Filed: Jun. 22, 2009

(65) Prior Publication Data

US 2010/0001490 A1    Jan. 7, 2010

(30) Foreign Application Priority Data

Jun. 23, 2008 (DE) .......... 10 2008 030 626

(51) Int. Cl.
*B60D 1/54* (2006.01)

(52) U.S. Cl.
USPC .......... 280/491.1; 280/504; 280/491.3; 280/491.4; 280/491.5; 280/494; 280/495

(58) Field of Classification Search .......... 280/491.1, 280/504, 491.3, 491.4, 491.5, 494, 495
See application file for complete search history.

(56) References Cited

U.S. PATENT DOCUMENTS

| 4,109,930 | A | | 8/1978 | Pilhall |
| 4,950,010 | A | | 8/1990 | Denny |
| 5,702,118 | A | | 12/1997 | Hanson et al. |
| 5,853,186 | A | * | 12/1998 | Gentner et al. .......... 280/491.3 |
| 5,853,187 | A | * | 12/1998 | Maier .......... 280/495 |
| 6,464,240 | B1 | | 10/2002 | Seksaria et al. |
| 6,908,095 | B2 | * | 6/2005 | Reutlinger et al. .......... 280/491.3 |
| 7,216,886 | B2 | * | 5/2007 | Rimmelspacher et al. 280/491.3 |
| 7,273,222 | B2 | * | 9/2007 | Rampp .......... 280/491.3 |
| 7,819,416 | B2 | * | 10/2010 | Moss .......... 280/491.1 |
| 2004/0113391 | A1 | * | 6/2004 | Aufderheide et al. .......... 280/491.1 |
| 2007/0007749 | A1 | * | 1/2007 | Gentner et al. .......... 280/491.1 |
| 2011/0031718 | A1 | * | 2/2011 | Di Parma et al. .......... 280/504 |

FOREIGN PATENT DOCUMENTS

| DE | 28 12 485 | 9/1979 |
| DE | 78 08 690 | 2/1988 |
| DE | 295 06 341 | 6/1995 |
| DE | 103 47 817 | 5/2005 |
| DE | 20 2006 008 462 | 7/2006 |
| EP | 1 022 164 | 7/2000 |
| FR | 2 310 233 | 12/1976 |
| GB | 2 020 240 | 11/1979 |

* cited by examiner

Primary Examiner — Tashiana Adams
Assistant Examiner — Marlon Arce
(74) Attorney, Agent, or Firm — Lipsitz & McAllister, LLC

(57) ABSTRACT

In order for a trailer hitch comprising a cross-member, which has its longitudinal direction extending transversely to a longitudinal direction of a vehicle and which can be connected to a body of a vehicle, a ball neck, which at a first end region is connected to the cross-member by means of a bearing unit and at a second end region carries a coupling ball, to be improved such that it has a lower weight, it is proposed that the cross-member is in the form of a hollow shaped body which varies in cross-sectional shape and has a central region and outer regions which adjoin the central region on both sides and extend as far as outer ends of the hollow shaped body, and that, starting from the outer ends, a cross-sectional shape of the outer regions has a cross-sectional area that increases progressively in the direction of the central region.

38 Claims, 10 Drawing Sheets

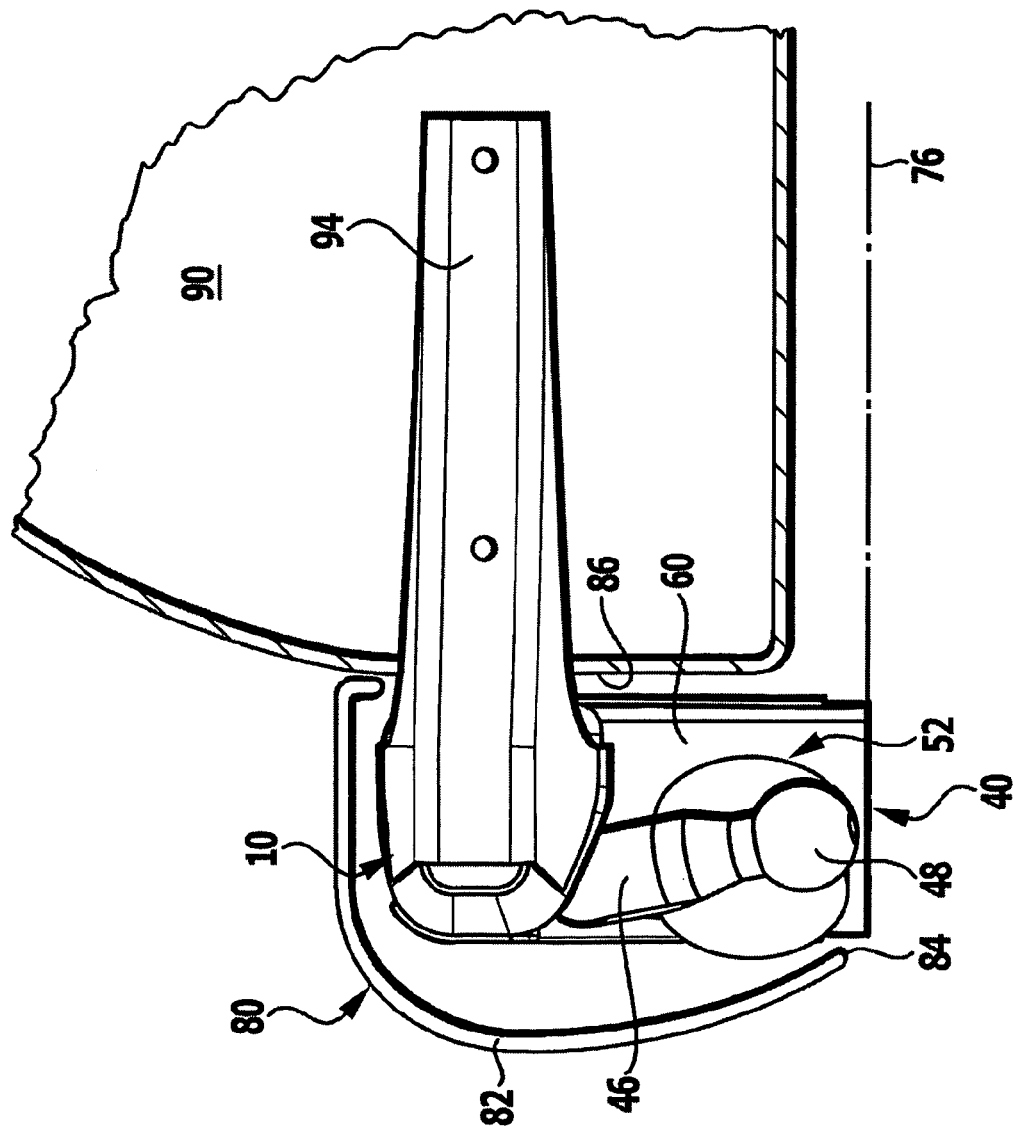

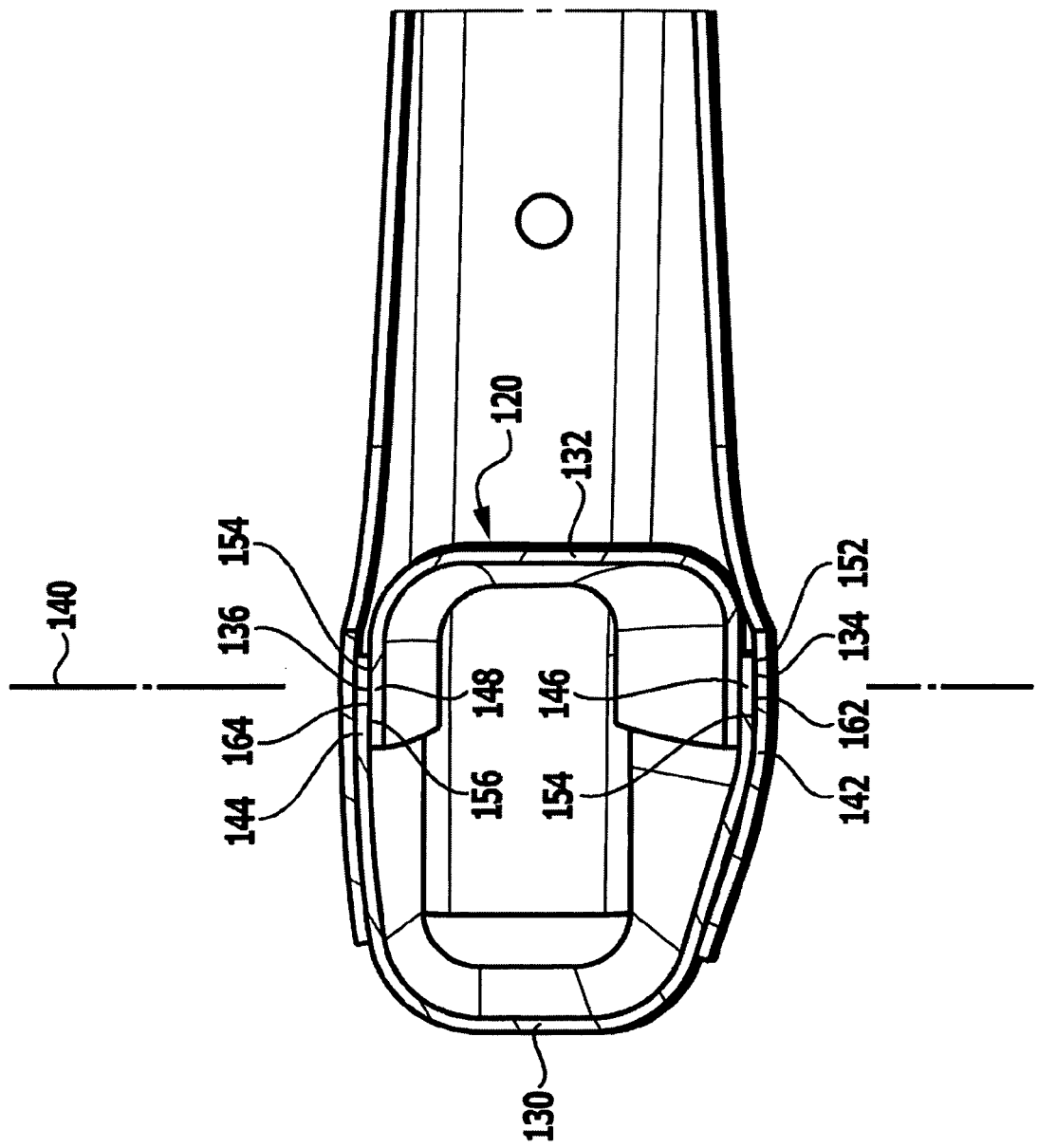

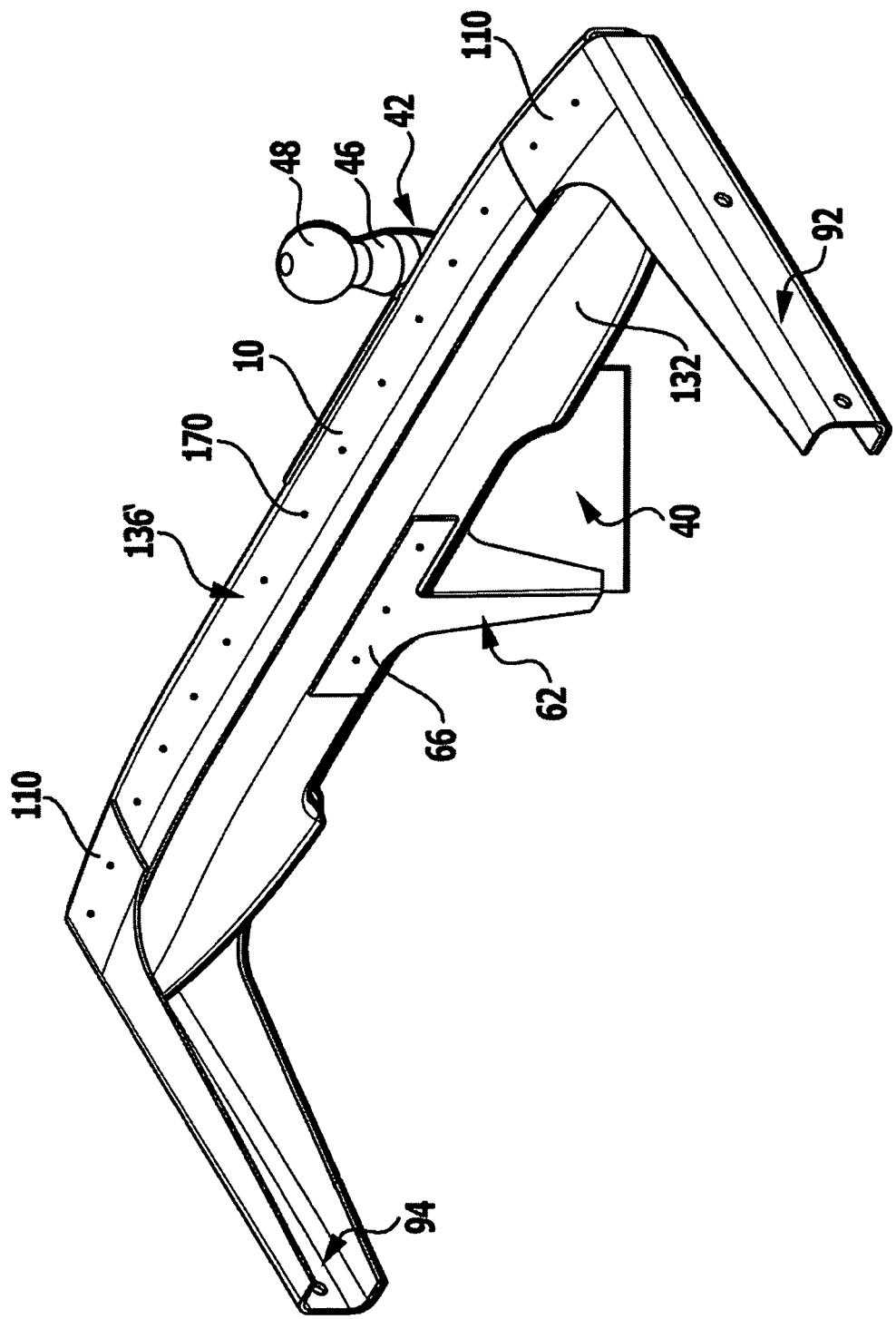

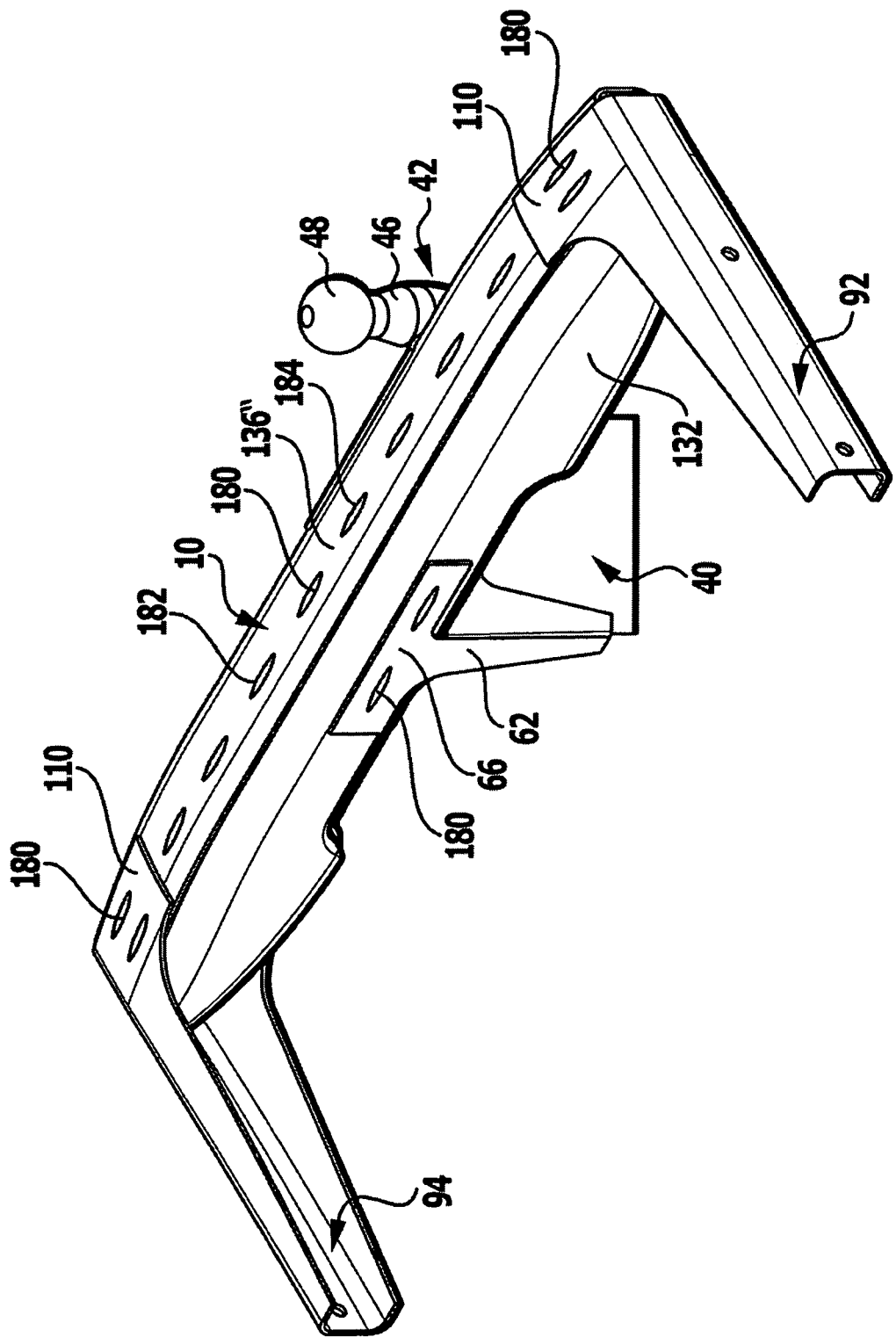

TRAILER HITCH

This patent application claims the benefit of German Application No. 10 2008 030 626.6, filed Jun. 23, 2008, the teachings and disclosure of which are hereby incorporated in their entirety by reference thereto.

BACKGROUND OF THE INVENTION

The invention relates to a trailer hitch comprising a cross-member, which has its longitudinal direction extending transversely to a longitudinal direction of a vehicle and which can be connected to a body of a vehicle, a ball neck, which at a first end region is connected to the cross-member by means of a bearing unit and at a second end region carries a coupling ball.

Trailer hitches of this kind are known from the prior art. In the case of these known trailer couplings, the cross-member is usually in the form of a steel tube.

Trailer hitches of this kind have a high weight.

It is thus an object of the invention for a trailer hitch of the type in question to be improved such that it has a lower weight.

SUMMARY OF THE INVENTION

This object is achieved, according to the invention, in the case of a trailer hitch of the type described in the introduction, in that the cross-member is in the form of a hollow shaped body which varies in cross-sectional shape and has a central region and outer regions which adjoin the central region on both sides and extend as far as outer ends of the hollow shaped body, and in that, starting from the outer ends, a cross-sectional shape of the outer regions has a cross-sectional area that increases progressively in the direction of the central region.

The advantage of the solution according to the invention can be seen in the fact that forming the cross-member as a hollow shaped body which varies in cross-sectional shape makes it possible for the shape of the hollow shaped body to be adapted to the force path, in particular to the bending and torsional forces introduced by the ball neck into the cross-member, and thus for an improved force path to be achieved by the variation in the shape of the hollow shaped body, this improved force path, in turn, allowing a reduction in the weight of the hollow shaped body.

The outer regions of the cross-member here could be of different shapes.

A particularly advantageous solution, however, provides that the outer regions are formed symmetrically with respect to a center plane of the hollow shaped body, so that the force conditions and the force path and also the absorption of the bending and torsional forces are the same in each outer region.

In order to optimize the force absorption, it has proven advantageous if in relation to a center axis extending parallel to the longitudinal direction of the cross-member, the outer regions of the hollow shaped body have lower wall regions which are directed toward a roadway and, starting from the outer ends, diverge from the center axis in the direction of the central region to a more pronounced extent than upper wall regions, which are directed away from a roadway.

This means that the hollow shaped body is formed non-symmetrically in relation to a horizontal plane running through the center axis and in particular the wall regions of the outer regions diverge from the center axis to different extents, that is to say are drawn downward in the direction of the roadway to a more pronounced extent than the upper wall region in the outer regions, which is directed away from the roadway.

No specific details have been given up until now in respect of the formation of the hollow shaped body itself.

Thus, an advantageous solution provides that the hollow shaped body is in the form of a hollow shaped body which is closed around the center axis over at least two thirds of the extent of the center axis, that is to say that the hollow shaped body has openings, at most, over a total of a third of the extent of the center axis, that is to say it is not closed around the center axis, it being possible for these openings to be disposed at a number of locations, and at intervals from one another, in the direction of the center axis.

This solution provides an optimized stable shape for the hollow shaped body. It is particularly advantageous, however, if the hollow shaped body is in the form of a hollow shaped body which is closed around the center axis all the way along, that is to say that the hollow shaped body completely encloses, substantially over its entire length, the center axis in the direction of the axis.

Such a formation of the hollow shaped body has not only the advantage of being straightforward to produce, but also has the advantage of it thus being possible for the interior enclosed by the hollow shaped body to be utilized for accommodating media or additional subassemblies, which thus no longer need to be accommodated in the motor vehicle bodywork.

For example, there is the possibility of using the space in the hollow shaped body for accommodating liquids, for example wash water for the windshields, and additional liquids for vehicle subassemblies, or else for accommodating subassemblies, for example for pumping subassemblies for the windshield wiper or the like.

There is, however, also the possibility of the interior of the hollow shaped body advantageously being used for storing vehicle equipment or other accessories. It is possible, in particular, for tools, jacks, and emergency equipment, e.g. a warning triangle or first-aid kit, to be disposed in the hollow shaped body, in which case a closeable access opening is necessary.

The hollow shaped body may be constructed in a variety of different ways; for example, it would be conceivable to form the hollow shaped body by expanding a tubular part which is already closed.

However, the hollow shaped body can be produced particularly straightforwardly if it is formed from two shell bodies.

The two shell bodies, then, may be formed in different ways. In particular, the hollow shaped body can be divided up into two shell bodies in a variety of different ways.

A particularly expedient way of dividing up the hollow shaped body provides that one of the shell bodies forms a region of the hollow shaped body which is directed away from the vehicle.

Such a solution has the great advantage that the bending forces to which the cross-member is subjected by the ball neck can thus advantageously be introduced into this shell body and distributed by this without a connection to another shell body being exposed to very pronounced bending loading.

Furthermore, it is advantageous if another of the shell bodies forms a region of the hollow shaped body which is directed toward the vehicle, so that this shell body is also readily suitable for absorbing the bending forces which act by way of the ball neck.

The shell bodies are expediently connected to one another here by means of shell-body connections. These shell-body connections may be formed in a variety of ways.

The shell-body connections may run, in principle, on each side of the hollow shaped body.

However, in order for the shell-body connections to be subjected to the least possible loading by bending forces and torsional forces, an advantageous solution provides that the one shell connection runs on a side of the shell bodies which is directed toward the roadway.

A further advantageous solution provides that one shell connection runs on a side of the shell bodies which is directed away from the roadway.

A particularly advantageous embodiment of the shell-body connection according to the invention provides that the shell-body connection extends in the longitudinal direction of the cross-member and thus fixes the shell bodies relative to one another at least in certain portions along the longitudinal direction of the cross-member.

In order to achieve the most extensive possible connection of the shell bodies, it is preferably provided that the shell-body connection extends in the longitudinal direction over at least two thirds of an extent of the shell bodies in this direction.

It is even better if the shell-body connection extends in the longitudinal direction over at least 80% of the extent of the shell bodies in this direction.

It is particularly advantageous here if the shell connection is a connection which runs continuously in the longitudinal direction, so that the shell bodies are fixed relative to one another over a substantial portion and can thus transfer bending forces and torsional forces between one another in this region.

For example, the shell bodies could be connected to one another at a number of locations by a plurality of connecting elements acting on them.

An advantageous solution, however, provides that each shell-body connection connects a strip region of one shell body to a strip region of another shell body.

Such a substance to substance bonded or material locking connection would be, for example, a weld connection or adhesive-bonding connection, in which the strip regions abut against one another.

A particularly advantageous solution, however, provides that the strip regions which form the shell-body connection overlap one another and engage face-to-face against one another.

For example, it is possible here for the strip regions to project in a flange-like manner from the shell bodies in the direction of a parting plane and to engage against one another in the process.

A particularly advantageous form, however, provides that a strip region of a shell body engages face-to-face against an inner side of a strip region of the other shell body, and that the strip regions here extend in particular transversely to a parting plane of the shell bodies.

It is particularly advantageous here if the strip regions are connected to one another in a substance to substance bonded or material locking manner.

It is advantageous here if the strip regions engaging against one another can be connected to one another by a substance to substance bonded or material locking face-to-face connection.

In respect of the bonded connection, it would be conceivable, for example, to provide a brazed connection.

A particularly advantageous manner of connecting the strip regions, however, provides an extensive adhesive-bonding layer between the strip regions.

A positive or form locking shell-body connection is provided as an alternative, or in addition, to a substance to substance bonded or material locking connection.

In respect of the variation in shape of the hollow shaped body, the exemplary embodiments which have been described up until now have involved definitions merely relating to the outer regions.

A further advantageous solution provides that the central region of the hollow shaped body has a narrowed portion.

Such a narrowed portion may be disposed on each side of the hollow shaped body.

For example, such narrowed portions are disposed on a rear side of the hollow shaped body, this rear side being directed away from the vehicle.

It is particularly advantageous, however, if the narrowed portion is located on a side of the central region which is directed toward the roadway.

The narrowed portion is preferably formed here such that it forms an accommodating space for a ball neck in the rest position, so that by virtue of the narrowed portion, a more compact construction of the trailer hitch can be achieved, in particular in the rest position of the ball neck, so that the overall height of the unit comprising cross-member and ball neck can be kept as low as possible.

For example, the narrowed portion here is formed such that the narrowed portion region has a cross-sectional area which is smaller than a cross-sectional area at the transition from the outer regions to the central region.

The ball neck can be curved basically in a variety of different ways, for example as a semicircle. An advantageous solution, however, provides that the ball neck has a central arm running between the second end region, which carries the ball head, and the first end region, which is connected to the bearing unit, and that, in the rest position, the central arm extends along the cross-member.

It is particularly expedient here if, in the rest position, the central arm is located in the accommodating space facing toward the central region of the hollow shaped body, and if the end regions of the ball neck extend away from the central region.

No specific details have been given up until now in respect of the fixing of the bearing unit on the central region.

Thus, an advantageous solution provides that mounting members for the bearing unit which hold the ball neck are disposed on the central region.

These mounting members could be held in a variety of different ways on the hollow shaped body. An advantageous solution provides that the mounting members are held on a side of the hollow shaped body which is directed toward the vehicle.

It is also advantageous if mounting members are held on a side of the hollow shaped body which is directed away from the vehicle.

Furthermore, no specifics have been mentioned up until now in respect of the bearing unit.

For example, the bearing unit may be in the form of a releasable mount for the ball neck, so that the ball neck can be removed from the bearing unit and stored, for example, in the hollow shaped body or in the trunk of the vehicle.

Another advantageous solution provides that the bearing unit is a pivot bearing, the at least one mounting unit holding the bearing base of the pivot bearing.

Furthermore, no explanation has been given up until now in respect of fixing the hollow shaped body on the vehicle bodywork.

Thus, an advantageous solution provides that the hollow shaped body is connected to side members which, for their part, are connected to the vehicle bodywork.

The side members here are preferably disposed such that they grip onto the outer regions of the hollow shaped body.

The side members here are preferably not fixed to the ends of the hollow shaped body.

It is thus expediently provided that the side members have at least one flange plate which can be positioned against the hollow shaped body.

The flange plate here is preferably positioned face-to-face against the hollow shaped body and is thus adapted to the surface structure of the hollow shaped body.

The fixing between the hollow shaped body and the side members is even more advantageous if the side members have two flange plates engaging against opposite sides of the hollow shaped body.

It is preferable here for one of the flange plates to engage against a side which is directed toward the roadway and for one of the flange plates to engage against a side which is directed away from the roadway.

Furthermore, the side members are preferably formed such that they have a strut which carries the at least one flange plate.

The strut here is preferably C-shaped in cross section and comprises, for example, a cross-flange and flange parts disposed on both sides of the cross-flange.

The flange plate here is preferably integrally formed on a flange part of the C-shaped strut.

No specific details have been given up until now in respect of the formation of the material for forming the hollow shaped body.

It would thus be conceivable, for example, to produce the hollow shaped body from plastics material, for example from fiber-reinforced plastics material or in particular carbon-fiber-reinforced plastics material.

Another advantageous solution provides that the hollow shaped body is produced from sheet-metal material, in particular from a high-strength sheet-metal material, so that the wall thickness can thus be reduced.

Further features and advantages of the invention form the subject matter of the following description and of the illustration of a number of exemplary embodiments in the drawing.

BRIEF DESCRIPTION OF THE DRAWINGS

FIG. 7 shows a view similar to FIG. 4 with the ball neck in the rest position;

FIG. 8 shows a section through a cross-member of the trailer hitch according to the invention as seen along line 8-8 in FIG. 1;

FIG. 9 shows an illustration, similar to FIG. 1, of a second exemplary embodiment of a trailer hitch according to the invention; and FIG. 10 shows an illustration, similar to FIG. 1, of a third exemplary embodiment of a trailer hitch according to the invention.

DETAILED DESCRIPTION OF THE INVENTION

Figure 1:
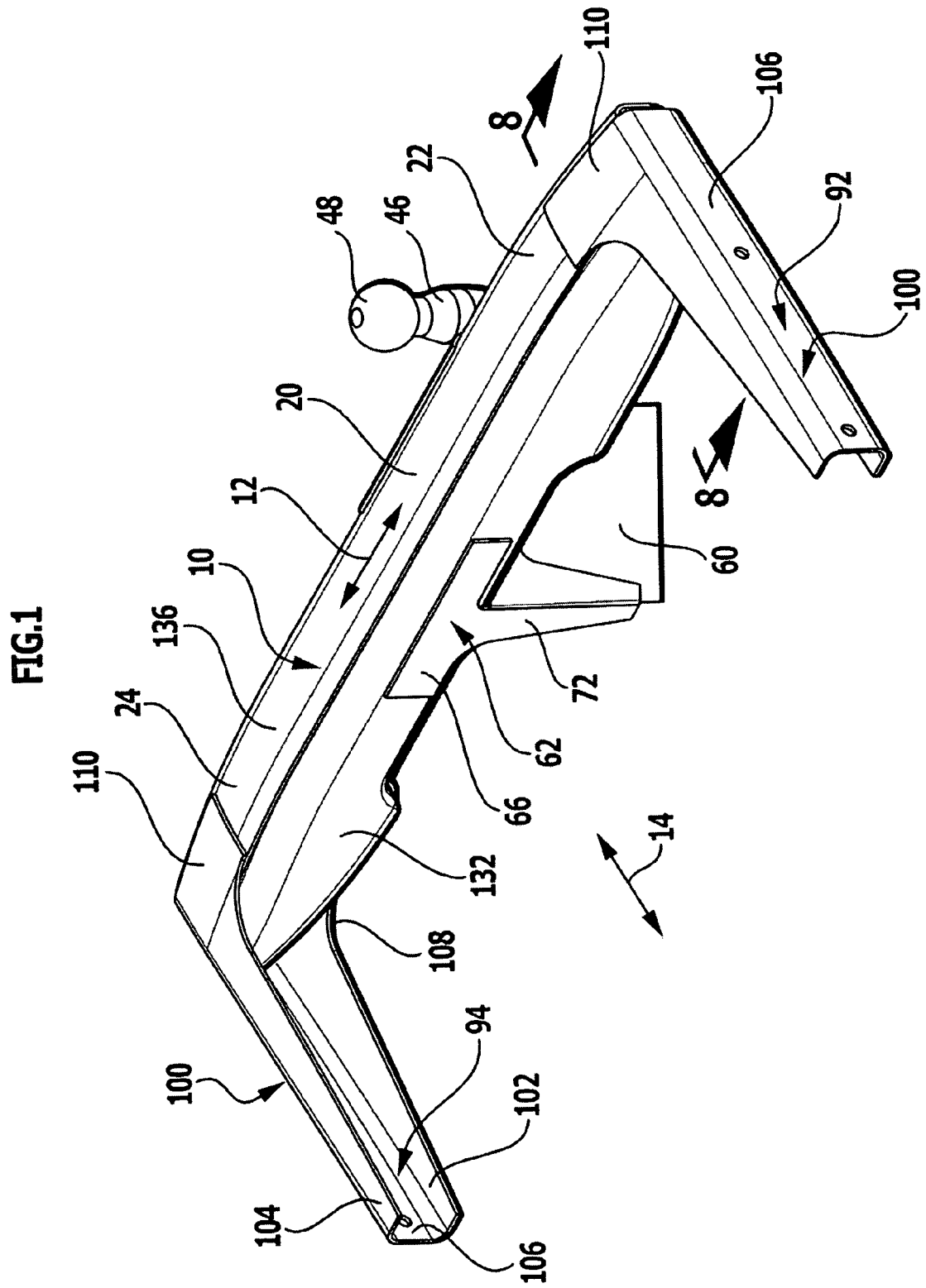
FIG. 1 shows a perspective view from the front left of a first exemplary embodiment of the trailer hitch according to the invention.

An exemplary embodiment of a trailer hitch according to the invention which is illustrated in FIGS. 1 to 8 comprises a cross-member 10, the longitudinal direction 12 of which extends transversely to a longitudinal direction 14 of a vehicle, to be precise in each case between its outer ends 16 and 18.

The cross-member 10 here comprises outer regions 22 and 24 which extend in the direction of a central region 20 from the outer ends 16 and 18, widen increasingly from a cross-sectional area Qa, which is present at the outer ends 16 and 18, and, adjacent to the central region 20, have cross-sectional areas Qi which are larger than the cross-sectional areas Qa, preferably considerably larger than the cross-sectional areas Qa.

In particular the outer regions 22, 24 here are formed such that their cross-sectional area Q increases constantly from the cross-sectional area Qa to the cross-sectional area Qi.

The outer regions 22, 24 of the cross-member 10 here are preferably formed such that they run symmetrically with respect to a longitudinal center plane 26 of the trailer hitch and also of the vehicle on which the trailer hitch is mounted, the longitudinal center plane 26 extending parallel to the longitudinal direction 14 of the vehicle.

The central region 20 of the cross-member 10 continues on from the outer regions 22 and 24 in the first instance with the same cross-sectional area Qi, but is provided on an underside, which is directed toward a roadway 28, with a narrowed portion 30, so that, in the region of the narrowed portion, the cross-sectional area Qe is reduced in relation to the cross-sectional area Qi following the outer regions 22, 24.

Figure 2:
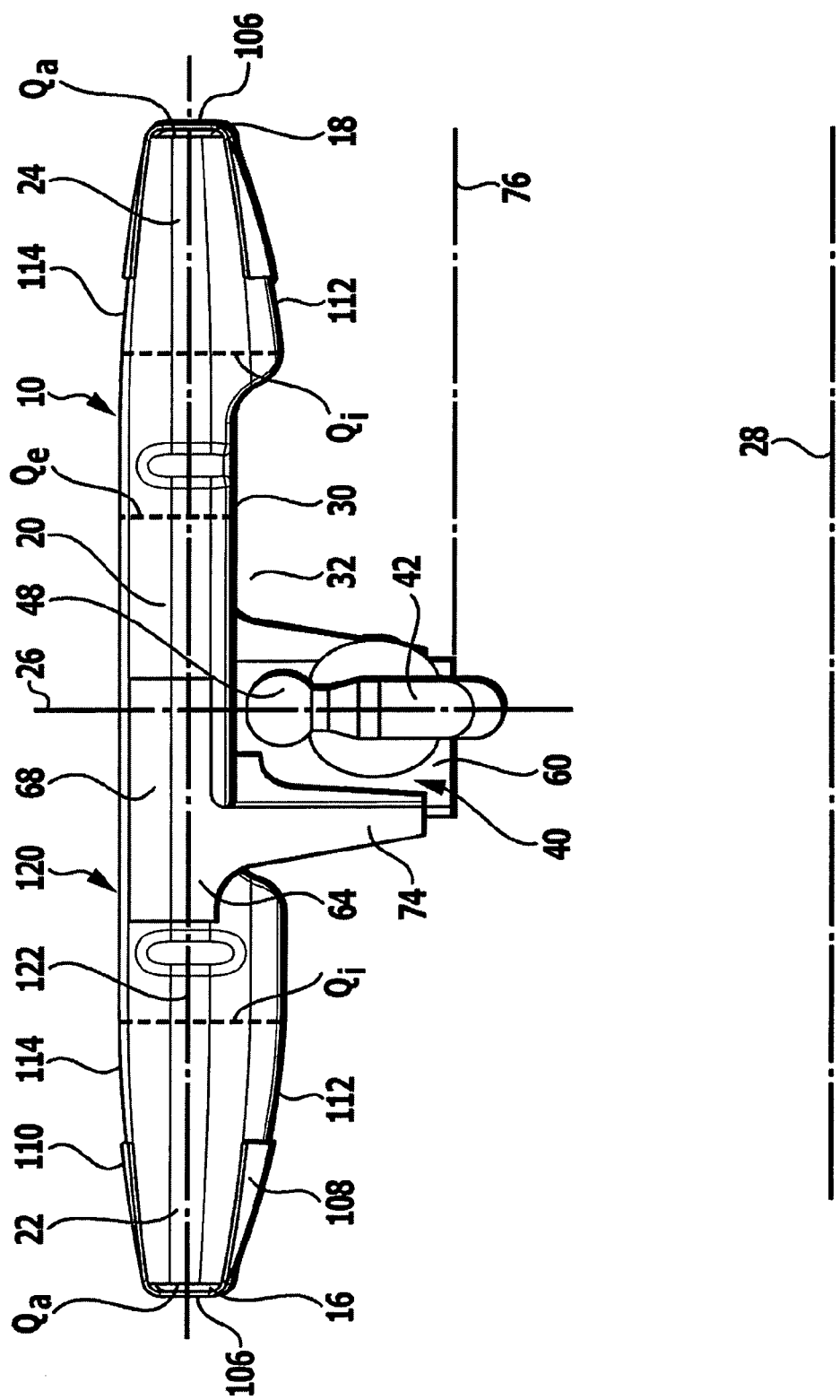
FIG. 2 shows a plan view from the rear of the first exemplary embodiment of the trailer hitch according to the invention.

In the case of the exemplary embodiment illustrated, as is illustrated in FIG. 2, the narrowed portion 30 is disposed asymmetrically with respect to the longitudinal center plane 26 and begins at a distance from the outer region 22, so that, starting from the outer region 22, the central region 20 extends to the narrowed portion 30 still with a cross-sectional area which corresponds at least to the cross-sectional area Qi, whereas the narrowed portion 30 substantially immediately adjoins the outer region 24 in the central region 20.

The narrowed portion 30 here serves to create an accommodating space 32, the function of which will be explained in more detail hereinbelow, on an underside of the cross-member 10, this underside being directed toward the roadway 28.

Figure 3:
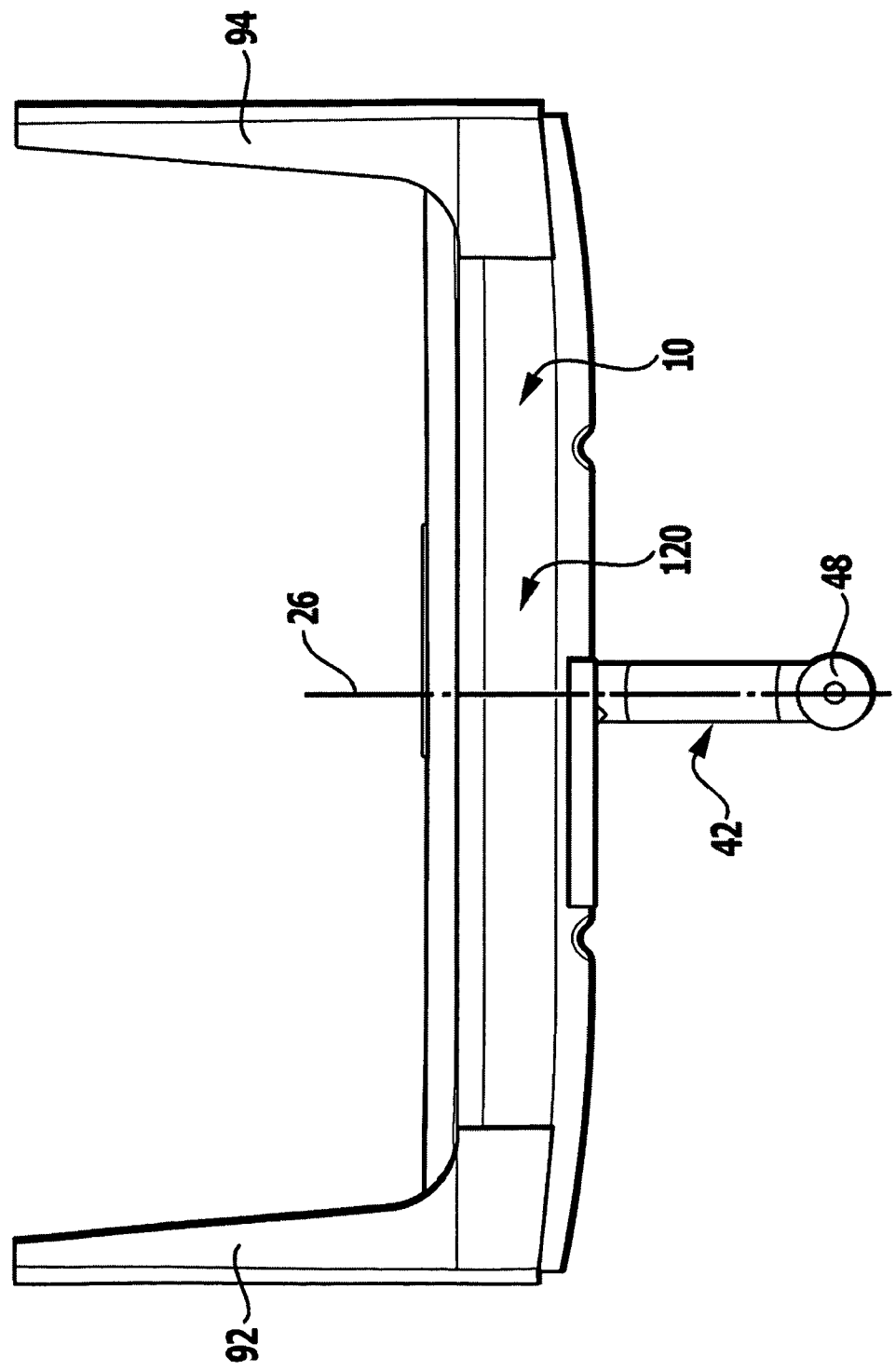
FIG. 3 shows a plan view from above of the first exemplary embodiment of the trailer hitch according to the invention.
Figure 4:
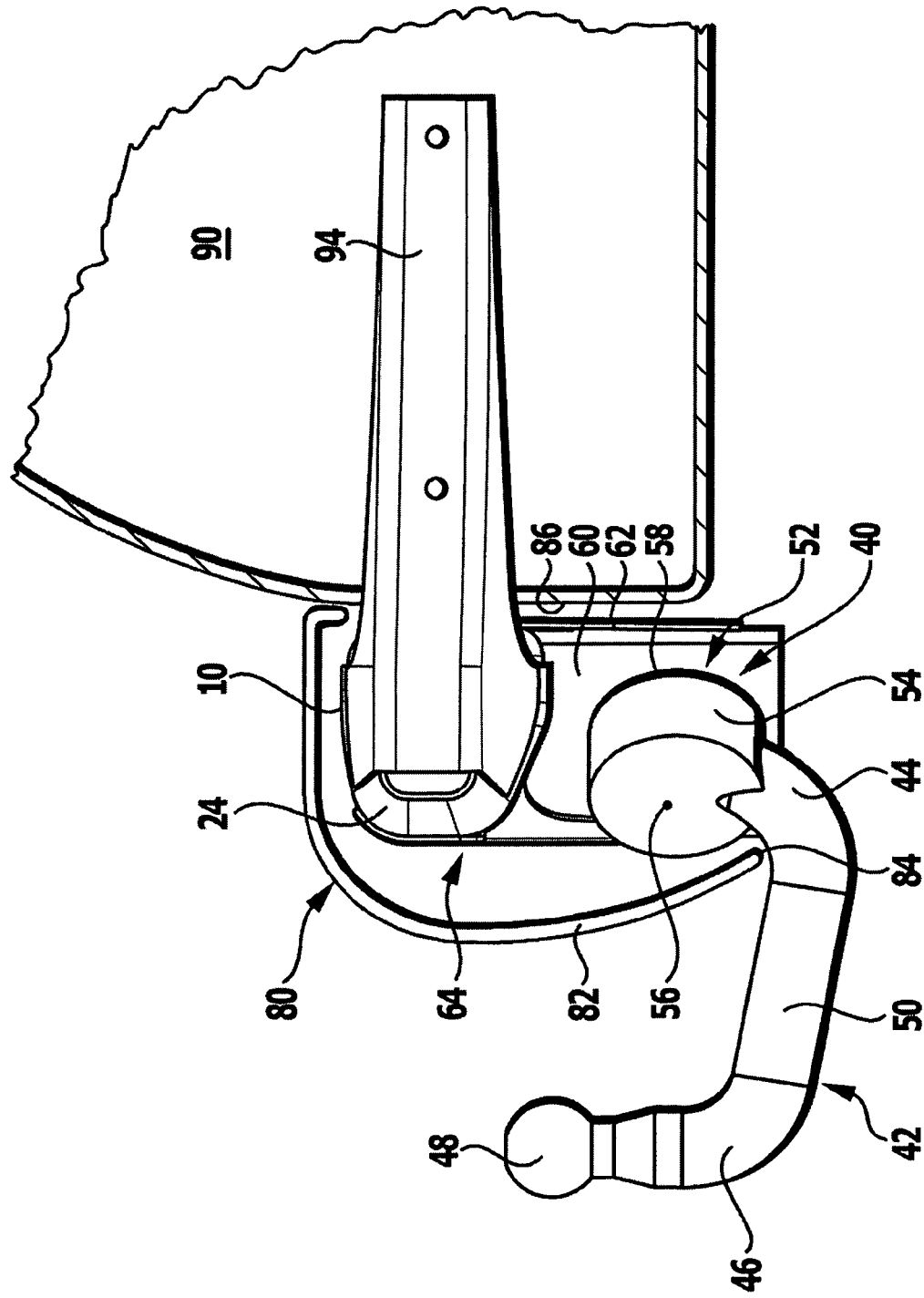
FIG. 4 shows a side view from the left of the first exemplary embodiment of the trailer hitch according to the invention with the vehicle body partially in section.

A ball neck designated as a whole by 42 is mounted on the central region 20 by means of a bearing unit 40 disposed in the region of the accommodating space 30 and extending from the central region in the direction of the roadway 28, and this ball neck, as is illustrated in FIG. 4, has an end region 44, which is connected to the bearing unit 40, and a second end region 46, which is located opposite the end region 44 and carries a coupling ball 48. A central arm 50 of the ball neck 42 is also located between the end regions 44 and 46. In FIGS. 1 to 4, the ball neck 42 is in the operating position and extends in the longitudinal center plane 26.

In the case of the exemplary embodiment illustrated, the bearing unit 40 is provided with a pivot bearing which is designated as a whole by 52 and has a pivot-bearing head 54 which is connected to the first end region 44 and, for its part, is mounted such that it can rotate about a pivot pin 56 in relation to a vehicle-mounted bearing part 58.

The vehicle-mounted bearing part 58, for its part, is disposed on a bearing base 60 which is connected to the central region 20 of the cross-member 10 in the region of the narrowed portion 30, for examples as illustrated in FIGS. 1 and 2, via mounting members 62 and 64 which, on the one hand, are connected to the central region 20 of the cross-member 10 via mounting flanges 66 and 68 and, on the other hand, have receiving mounts 72 and 74, to which the bearing base 60 is connected.

Figure 5:
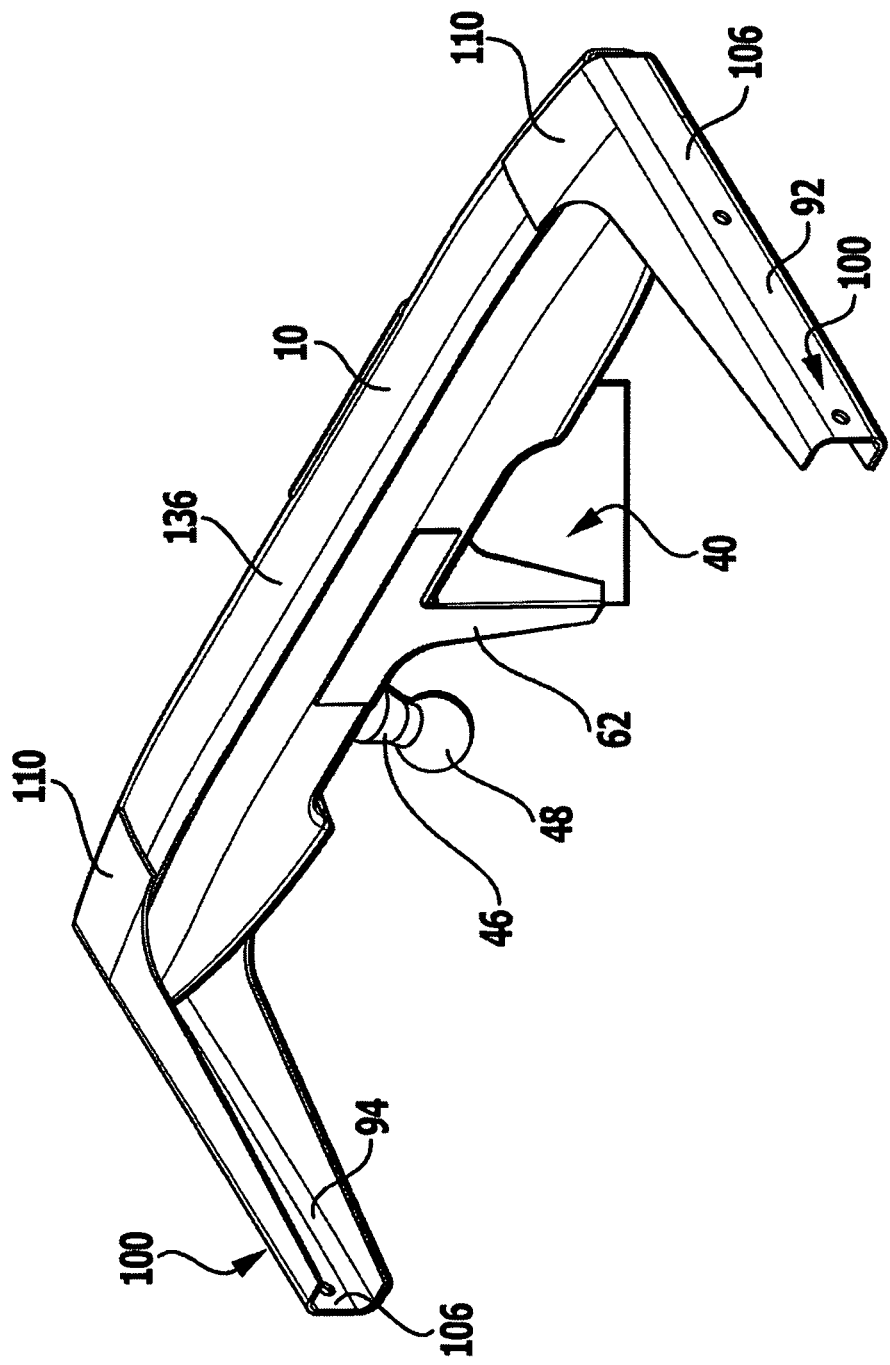
FIG. 5 shows a view similar to FIG. 1 of the first exemplary embodiment with the ball neck in the rest position.
Figure 6:
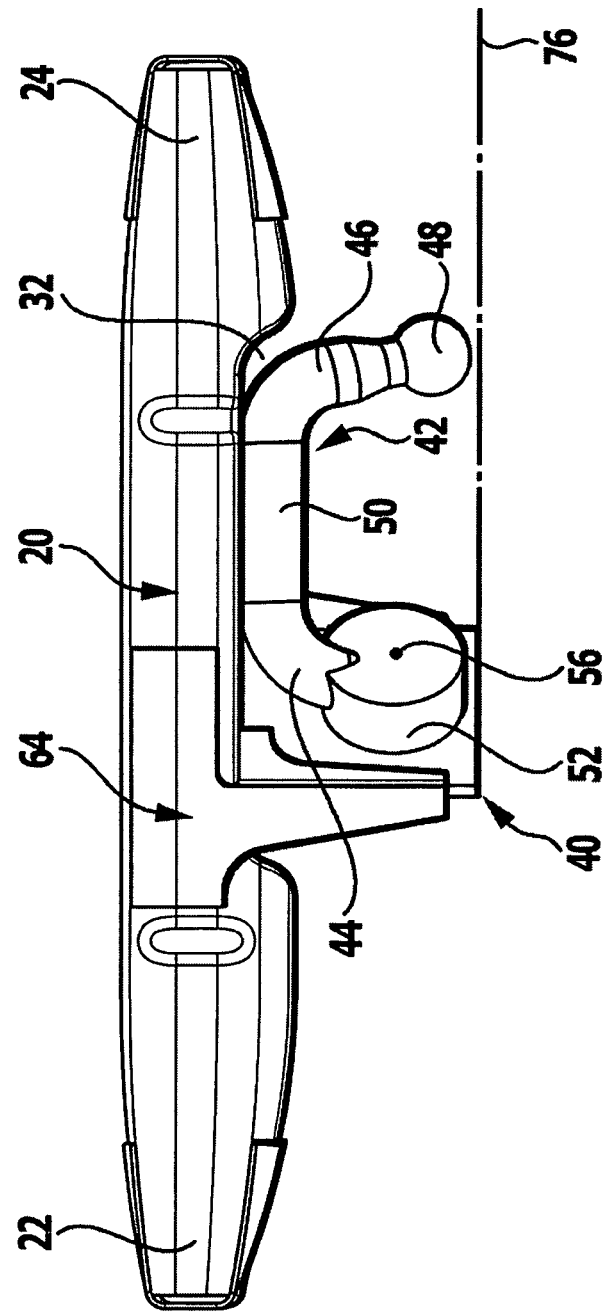
FIG. 6 shows a view similar to FIG. 2 with the ball neck in the rest position.

The pivot bearing 52 makes it possible for the ball neck 42 with the coupling ball 48 to be pivoted from an operating position, which is illustrated in FIGS. 1 to 4, into a rest position, which is illustrated in FIGS. 5, 6 and 7 and in which the ball neck 42 is disposed in the accommodating space 32, created by the narrowed portion 30, and above a horizontal plane 76 running through the lowermost point of the bearing unit 40, it also being the case in the exemplary embodiment illustrated that the coupling ball 58 is located above the plane 76. In other geometric configurations, however, it is also conceivable for the coupling ball 48 to be located partially, or even wholly, beneath the plane 76, that is to say on a side of this plane which is directed toward the roadway 28.

In the case of the first exemplary embodiment illustrated, the narrowed portion 30 and the accommodating space 32 formed thereby make it possible for the ball neck 42, in particular its central arm 50, to be disposed, in the rest position, as high as possible above the roadway 28 in that the central arm 50 is located beneath and close to the central region 20, in the accommodating space 32 thereof, and the end regions 44, 46 extend away from the central region 20 in the direction of the roadway 28.

As illustrated in FIGS. 4 and 7, the cross-member 10 is disposed beneath a fender unit 80 and has a fender cover 82 covering it, in particular a lower end 84 of the fender cover 82 being disposed in the vicinity of the roadway 28 such that this lower end is located approximately level with the plane 76 running through the lowermost point of the bearing unit 40.

It is thus the case that the cross-member 10 and the ball neck 42, in its rest position, are concealed from a motor-vehicle user's view by the fender cover 82.

The cross-member 10 is preferably located directly behind a rear apron 86 of a vehicle body, which is designated as a whole by 90, and is connected to the vehicle body 90 via side members 92, 94, the side members 92 and 94 constituting the tension-resistant connection between the cross-member 10 and the vehicle body 90.

The side members 92 and 94 comprise, as illustrated by way of example using the side member 94 in FIG. 1, a strut 100 which comprises a lower flange part 102, an upper flange part 104 and a bridging flange part 106 that connects these flange parts 102 and 104, the flange parts being disposed in a C-shaped manner relative to one another, the bridging flange part 106 engaging over the cross-member 10 in the region of its ends 16 and 18, but not being connected directly to the ends 16 and 18.

Rather, the flange parts 102 and 104 extend by way of flange plates 108 and 110 over part of the outer regions 22 and 24 of the cross-member 10 and are preferably connected face-to-face to the outer regions 22 and 24.

The connection between the flange plates 108 and 110 of the side members 92 and 94 and the outer regions 22 and 24 of the cross-member 10 takes place, for example, by an adhesive-bonding connection, in which case the flange plates 108 and 110 engage face-to-face with substantially full surface-area contact against certain surface areas of the outer regions 22 and 24 of the cross-member 10 on undersides 112 and upper sides 114 of the outer regions 22 and 24.

The cross-member 10 is in the form of a hollow shaped body 120 which varies in shape, extends about a center axis 122 from the one end 16 to the other end 18 and, in the process, substantially encloses the center axis 122 over its extent in the longitudinal direction 12. The center axis 122 is preferably enclosed over at least 80% of its length, so that only small portions of the center axis 122 are possibly not fully enclosed.

In the case of the embodiment illustrated, the hollow shaped body 120 is completely closed along the center axis 122, that is to say that it does not have any through-passages impairing stability and stiffness.

The increase in cross-sectional area from the cross-sectional area Qa to the cross-sectional area Qi of the outer regions 22 and 24 takes place for example—as illustrated in FIG. 2—in that, as the underside 112 extends to the central part 20 from the ends 16, 18, it diverges from the center axis 122 to a more pronounced extent than the upper side 114 and thus serves to increase the torsional stiffness of the hollow shaped body 120 as the distance from the side members 92 and 94 increases, since the ball neck 42 subjects the central region 20 to torsional moments which have to be transferred from the central region 20 to the outer regions 22 and 24 and have to be absorbed by the outer regions 22 and 24 with the highest possible level of torsional stiffness and transferred to the side members 92 and 94.

Furthermore, the ball neck 42 subjects the central region 20 to bending forces which likewise have to be transferred from the central region 20 to the side members 92 and 94 via the outer regions 22 and 24. It is also advantageous for these bending forces if the outer regions 22 and 24 of the cross-member 10 have a cross-sectional area which increases from the cross-sectional area Qa to cross-sectional area Qi.

Such a hollow shaped body 120 according to the invention with a cross-sectional area which varies in the direction of the center axis 122 can preferably be produced, as is illustrated in FIG. 8, by it being constructed from a first shell body 130 and a second shell body 132, the first shell body 130 being disposed on a side which is directed away from the rear apron 86 of the vehicle body 90, while the second shell body 132 is disposed on a side which is directed toward the rear apron 86 of the vehicle body 90, and the two shell bodies 130, 132 being connected to one another via a lower shell-body connection 134, which is directed toward the roadway 28, and an upper shell-body connection 136, which is directed away from the roadway 28.

The shell-body connections 134 and 136 here extend over the longitudinal direction 12 of the cross-member 10 from the one end 16 to the other end 18 and are formed by strip regions 142 and 144 of the first shell body 130, these strip regions extending transversely to a parting plane 140, and strip regions 146 and 148 of the second shell body 132, these strip regions extending transversely to the parting plane 140, it being the case that the second shell body 132 has its strip regions 146 and 148 engaging in the first shell body 130 and thus has outer sides 152 and 154 of the strip regions 146 and 148 engaging face-to-face against inner sides 154 and 156 of the strip regions 142 and 144 of the first shell body 130.

A connection between the strip regions 142 and 146 and also 144 and 148 preferably takes place by an adhesive-bonding layer 162 and 164 which is disposed between these strip regions, thus extends fully over the surface area in the region of the overlapping surface and in particular runs substantially over the entire extent of the shell-body connections 134 and 136.

In the case of this exemplary embodiment, it is preferably also the case that the mounting flanges 66 and 68 are connected to the shell bodies 130 and 132 by an adhesive-bonding connection, the mounting flange 66 being adhesively bonded to the shell body 132 and the mounting flange 68 being adhesively bonded to the shell body 130.

Furthermore, it is preferably also the case that the flange plates 108 and 110 of the side parts 92 and 94 are connected via an adhesive-bonding connection, to be precise in each case to the two shell bodies 130 and 132, that is to say, on the one hand, in the region of the underside 112 and, on the other hand, in the region of the upper side 114.

The adhesive-bonding connection preferably takes place via a film which carries the adhesive and can thus easily be placed in position over the surface area and then, by virtue of the parts which are to be connected being heated, produces the bonded connection between these parts.

In particular a face-to-face adhesive-bonding connection has the advantage that the connecting layer which forms here also adapts to surface tolerances between the respective parts.

As an alternative to making an adhesive-bonding connection, it is advantageous to use a brazed connection since brazing metal likewise has the advantage that it adapts to surface tolerances and allows a fixed and durable face-to-face connection between the parts which are to be connected.

Furthermore, for example in order to increase the torsional stiffness or in order to create space for sensors, for example sensors for use when reversing a vehicle, it is also the case that, in the central region 20 of the shell body 130—as is illustrated in FIGS. 2 and 3—indented portions 168 are disposed on a rear side, which is directed away from the vehicle, these indented portions being located symmetrically with respect to the longitudinal center plane 26.

The shell bodies 130, 132 may be produced from sheet metal and be shaped as desired by a forming process. In the simplest case, the sheet metal is sheet steel.

However, it is also conceivable for the shell bodies to be produced from plastics material, in particular fiber-reinforced plastics material.

In the case of a further exemplary embodiment of a trailer hitch according to the invention, illustrated in FIG. 9, the shell-body connections 134' and 136' as well as the connections between the flange plates 108 and 110 and the cross-member 10, and also the connections between the mounting flanges 66 and 68 and the cross-member, are configured so as to provide, on the one hand, local positive connections, for example by rivets 170, although these are preferably also supplemented by face-to-face substance to substance bonded connections, for example the adhesive-bonding connections described in conjunction with the first exemplary embodiment.

This solution has the advantage that, by virtue of the local positive connections, the parts which are to be connected can be connected to one another in first instance to the extent where they remain as a unit and for example an adhesive does not have to maintain the connection initially; rather the adhesive can cure subsequently in a separate heating step, the parts being kept in engagement, face-to-face and fixed in position, by the local positive connections 170 until such time as the positive connection is produced by means of the adhesive, in particular since the parts are not subjected to any loading, as occurs in the use state of the trailer hitch.

The parts which are to be connected can thus be connected easily and quickly to one another, it not being necessary for this simple connection to be suitable for absorbing the subsequent forces which occur during operation of the trailer hitch; rather, this connection is created by the adhesive-bonding layer curing subsequently during the production process, for example in conjunction with the paint drying.

In the case of a third exemplary embodiment of a trailer hitch according to the invention, illustrated in FIG. 10, the shell-body connections 134" and 136", albeit only illustrated for the shell-body connection 136", rather than being face-to-face connections, are joining connections, namely so-called plug-weld connections 180, in the case of which a weld seam is provided along a periphery 182 of apertures 184, provided for example in the strip regions 142 and 144, and this weld seam connects the peripheral region 182 integrally to the strip region 146 or 148 located therebeneath.

Such plug welds 180 can also be used to produce connections between the flange plates 108 and 110, illustrated by way of the example of the flange plate 110 in FIG. 10.

In the same way, plug-weld connections 180 of this kind can also be produced between the mounting flanges 66 and 68, illustrated in FIG. 10 by way of the example of the mounting flange 66, and the cross-member 10, in the case illustrated in FIG. 10, the shell part 132 of the cross-member 10.

Such plug-weld connections 180 have the advantage that they do not have any thermal influence on the stability of the material of the shell parts 130 and 132 of the cross-member or of the flange plates 108 and 110 and of the mounting flanges 66 and 68, and thus do not give rise to any changes in joining properties in the respective material.

Plug-weld connections 180 of this kind are preferably configured as laser-weld connections which, on account of the fact that only a small quantity of adjacent material is melted, are suitable for producing a fixed connection.

It is also possible, however, for such plug-weld connections 180 to be provided in addition to face-to-face connections, for example adhesive-bonding connections, in order, in the same way as for the second exemplary embodiment, for the parts which are to be connected, that is to say the shell bodies 130 and 132, to be fixed relative to one another in the region of their respective strip regions 142, 144 and 146, 148, so that the face-to-face adhesive-bonding connection can cure at a later stage in order to produce an additional, or the actual, permanent connection between these two parts.

It is also possible for the connections between the flange plates 108 and 110 of the side parts 92 and 94 and the cross-member 10 or also between the mounting flanges 66 and 68 and the cross-member 10 to be produced in the same way.

The invention claimed is:

1. Trailer hitch, comprising:
   a cross-member, which has a longitudinal direction extending transversely to a longitudinal direction of a vehicle and which can be connected to a body of a vehicle; and
   a ball neck with a first end region connected to the cross-member by means of a bearing unit and a second end region that carries a coupling ball;
   the cross-member being in a form of a hollow shaped body which varies in cross-sectional shape and having a central region and outer regions which adjoin the central region on both sides and extend as far as outer ends of the hollow shaped body;
   starting from the outer ends, a cross-sectional shape of the outer regions having a cross-sectional area that increases progressively in a direction of the central region; and
   the central region of the hollow shaped body having a narrowed portion that forms an accommodating space for the ball neck in a rest position, the narrowed portion having a cross-sectional area which is smaller than a cross-sectional area at a transition from the outer regions to the central region.

2. Trailer hitch according to claim 1, wherein the outer regions are formed symmetrically with respect to a center plane of the hollow shaped body.

3. Trailer hitch according to claim 1, wherein the hollow shaped body is in a form of a hollow shaped body which is closed around a center axis extending parallel to the longitudinal direction of the cross-member over at least two thirds of an extent of the center axis.

4. Trailer hitch according to claim 3, wherein the hollow shaped body is in a form of a hollow shaped body which is closed around the center axis over substantially the entire extent of the center axis.

5. Trailer hitch according to claim 1, wherein the hollow shaped body is formed from two shell bodies.

6. Trailer hitch according to claim 5, wherein one of the shell bodies forms a region of the hollow shaped body which is directed away from the vehicle.

7. Trailer hitch according to claim 5, wherein one of the shell bodies forms a region of the hollow shaped body which is directed toward the vehicle.

8. Trailer hitch according to claim 5, wherein the shell bodies are connected to one another by means of shell-body connections.

9. Trailer hitch according to claim 8, wherein each shell-body connection extends in the longitudinal direction of the cross-member.

10. Trailer hitch according to claim 8, wherein the shell-body connection extends in the longitudinal direction of the cross-member over at least two thirds of an extent of the shell body.

11. Trailer hitch according to claim 8, wherein the shell-body connection extends in the longitudinal direction of the cross-member over at least 80% of an extent of the shell body.

12. Trailer hitch according to claim 8, wherein each shell-body connection is a connection which runs continuously in the longitudinal direction of the cross member.

13. Trailer hitch according to claim 8, wherein the shell-body connection connects a strip region of one shell body to a strip region of another shell body.

14. Trailer hitch according to claim 13, wherein the strip regions which form the shell-body connection overlap one another and engage face-to-face against one another.

15. Trailer hitch according to claim 14, wherein a strip region of one shell body engages face-to-face against an inner side of a strip region of the other shell body.

16. Trailer hitch according to claim 13, wherein the shell-body connection connects the strip regions to one another in a substance to substance bonded manner or by material locking.

17. Trailer hitch according to claim 16, wherein the strip regions engaging against one another are connected to one another by substance to substance bonding or material locking face-to-face connection.

18. Trailer hitch according to claim 17, wherein the strip regions are connected to one another by an extensive adhesive-bonding layer.

19. Trailer hitch according to claim 8, wherein the shell-body connection is a positive or form locking connection.

20. Trailer hitch according to claim 1, wherein the narrowed portion is located on a side of the central region which is directed toward a roadway.

21. Trailer hitch according to claim 1, wherein:
the ball neck has a central arm running between the second end region of the ball neck carrying the coupling ball and the first end region connected to the cross member, and
in the rest position, at least part of the central arm extends along the cross-member.

22. Trailer hitch according to claim 21, wherein in the rest position, the central arm is located in the accommodating space facing toward the central region of the hollow shaped body, and the first end region and the second end region of the ball neck extend away from the central region.

23. Trailer hitch according to claim 1, further comprising mounting members for the bearing unit which holds the ball neck disposed on the central region.

24. Trailer hitch according to claim 23, wherein the mounting members are held on a side of the hollow shaped body which is directed toward the vehicle.

25. Trailer hitch according to claim 23, wherein the mounting members are held on a side of the hollow shaped body which is directed away from the vehicle.

26. Trailer hitch according to claim 23, wherein the bearing unit is a pivot bearing, at least one of the mounting members holding a bearing base of the pivot bearing.

27. Trailer hitch according to claim 1, wherein the hollow shaped body is connected to side members connected to the body of the vehicle.

28. Trailer hitch, comprising:
a cross-member, which has a longitudinal direction extending transversely to a longitudinal direction of a vehicle and which can be connected to a body of a vehicle; and
a ball neck with a first end region connected to the cross-member by means of a bearing unit and a second end region that carries a coupling ball;
the cross-member being in a form of a hollow shaped body which varies in cross-sectional shape and having a central region and outer regions which adjoin the central region on both sides and extend as far as outer ends of the hollow shaped body;
starting from the outer ends, a cross-sectional shape of the outer regions having a cross-sectional area that increases progressively in a direction of the central region;
the central region of the hollow shaped body having a narrowed portion that forms an accommodating space for the ball neck in a rest position; and
in relation to a center axis extending parallel to the longitudinal direction of the cross-member, the outer regions of the hollow shaped body each having a respective underside and a respective upper side, each of the undersides being directed toward a roadway and, starting from the outer ends, diverge from the center axis in the direction of the central region to a more pronounced extent than the respective upper sides, which are directed away from the roadway.

29. Trailer hitch according to claim 28, wherein the narrowed portion has a cross-sectional area which is smaller than a cross-sectional area at a transition from the outer regions to the central region.

30. Trailer hitch, comprising:
a cross-member, which has a longitudinal direction extending transversely to a longitudinal direction of a vehicle and which can be connected to a body of a vehicle; and
a ball neck with a first end region connected to the cross-member by means of a bearing unit and a second end region that carries a coupling ball;
the cross-member being in a form of a hollow shaped body which varies in cross-sectional shape and having a central region and outer regions which adjoin the central region on both sides and extend as far as outer ends of the hollow shaped body;

starting from the outer ends, a cross-sectional shape of the outer regions having a cross-sectional area that increases progressively in a direction of the central region;

the central region of the hollow shaped body having a narrowed portion that forms an accommodating space for the ball neck in a rest position;

the hollow shaped body being formed from two shell bodies which are connected to one another by means of shell-body connections; and one of the shell-body connections running on a side of the shell bodies which is directed toward a roadway.

31. Trailer hitch, comprising:

a cross-member, which has a longitudinal direction extending transversely to a longitudinal direction of a vehicle and which can be connected to a body of a vehicle; and a ball neck with a first end region connected to the cross-member by means of a bearing unit and a second end region that carries a coupling ball;

the cross-member being in a form of a hollow shaped body which varies in cross-sectional shape and having a central region and outer regions which adjoin the central region on both sides and extend as far as outer ends of the hollow shaped body;

starting from the outer ends, a cross-sectional shape of the outer regions having a cross-sectional area that increases progressively in a direction of the central region;

the central region of the hollow shaped body having a narrowed portion that forms an accommodating space for the ball neck in a rest position;

the hollow shaped body being formed from two shell bodies which are connected to one another by means of shell-body connections; and one of the shell-body connections running on a side of the shell bodies which is directed away from a roadway.

32. Trailer hitch, comprising:

a cross-member, which has a longitudinal direction extending transversely to a longitudinal direction of a vehicle and which can be connected to a body of a vehicle; and a ball neck with a first end region connected to the cross-member by means of a bearing unit and a second end region that carries a coupling ball;

the cross-member being in a form of a hollow shaped body which varies in cross-sectional shape and having a central region and outer regions which adjoin the central region on both sides and extend as far as outer ends of the hollow shaped body;

starting from the outer ends, a cross-sectional shape of the outer regions having a cross-sectional area that increases progressively in a direction of the central region;

the central region of the hollow shaped body having a narrowed portion that forms an accommodating space for the ball neck in a rest position; and the hollow shaped body being connected to side members connected to the body of the vehicle, the side members gripping onto the outer regions of the hollow shaped body.

33. Trailer hitch, comprising:

a cross-member, which has a longitudinal direction extending transversely to a longitudinal direction of a vehicle and which can be connected to a body of a vehicle; and a ball neck with a first end region connected to the cross-member by means of a bearing unit and a second end region that carries a coupling ball;

the cross-member being in a form of a hollow shaped body which varies in cross-sectional shape and having a central region and outer regions which adjoin the central region on both sides and extend as far as outer ends of the hollow shaped body;

starting from the outer ends, a cross-sectional shape of the outer regions having a cross-sectional area that increases progressively in a direction of the central region;

the central region of the hollow shaped body having a narrowed portion that forms an accommodating space for the ball neck in a rest position; and the hollow shaped body being connected to side members connected to the body of the vehicle, the side members having at least one flange plate which can be positioned against the hollow shaped body.

34. Trailer hitch according to claim 33, wherein the flange plate engages face-to-face against the hollow shaped body.

35. Trailer hitch according to claim 33, wherein the side members have two flange plates engaging against opposite sides of the hollow shaped body.

36. Trailer hitch according to claim 33, wherein the side members have a strut which carries the at least one flange plate.

37. Trailer hitch according to claim 36, wherein the strut is C-shaped in cross section.

38. Trailer hitch according to claim 37, wherein the flange plate is integrally formed on a flange part of the C-shaped strut.

* * * * *